US011751557B2

(12) United States Patent
Klemme et al.

(10) Patent No.: US 11,751,557 B2
(45) Date of Patent: Sep. 12, 2023

(54) DROP-DOWN APPLICATORS FOR AN AGRICULTURAL SPRAYER

(71) Applicant: Hagie Manufacturing Company, Clarion, IA (US)

(72) Inventors: Kent A. Klemme, Ankeny, IA (US); James R. Williams, Clarion, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/699,416

(22) Filed: Mar. 21, 2022

(65) Prior Publication Data

US 2022/0211024 A1    Jul. 7, 2022

Related U.S. Application Data

(63) Continuation of application No. 16/295,853, filed on Mar. 7, 2019, now Pat. No. 11,324,213.

(51) Int. Cl.
*A01M 7/00* (2006.01)

(52) U.S. Cl.
CPC ........ *A01M 7/0071* (2013.01); *A01M 7/0053* (2013.01); *A01M 7/006* (2013.01)

(58) Field of Classification Search
CPC .. A01M 7/005; A01M 7/0053; A01M 7/0057; A01M 7/006; A01M 7/0071; A01C 23/047
See application file for complete search history.

(56) References Cited

U.S. PATENT DOCUMENTS

| | | |
|---|---|---|
| 1,348,038 A | 7/1920 | Neumeyer |
| 1,526,642 A | 2/1925 | Nissley |
| 1,620,862 A | 5/1927 | Atkins |
| 1,626,772 A | 5/1927 | Worden |
| 1,629,041 A | 5/1927 | Minier |
| 1,696,736 A | 12/1928 | Scoville |
| 1,718,209 A | 6/1929 | Aldrich |
| 1,774,179 A | 8/1930 | MacGregor |
| 1,859,975 A | 5/1932 | Malkin |

(Continued)

FOREIGN PATENT DOCUMENTS

| | | |
|---|---|---|
| EP | 2777392 A2 | 9/2014 |
| WO | 2018017995 A1 | 1/2018 |

OTHER PUBLICATIONS

360 Yield Center, "PG17: Boom Height & Steering", https://www.youtube.com/watch?v=PUEduN6Q1QQ; Published Aug. 22, 2017.

*Primary Examiner* — Darren W Gorman

(74) *Attorney, Agent, or Firm* — Taft Stettinius & Hollister LLP; Stephen F. Rost

(57) ABSTRACT

An agricultural vehicle is moveable across a surface. The agricultural vehicle includes a chassis, a traction member coupled to the chassis with the traction member configured to engage the surface and move the chassis relative to the surface, a holding tank coupled to the chassis with the holding tank configured to support agricultural matter, a support boom coupled to the chassis, and a plurality of applicator assemblies. Each applicator assembly of the plurality of applicator assemblies includes a resilient body coupled to the support boom, a foot coupled to the body with the foot configured to be biased into engagement with the surface via the resiliency of the body, and a nozzle. The nozzle is in communication with the holding tank and configured to dispense the agricultural matter.

19 Claims, 7 Drawing Sheets

(56) References Cited

U.S. PATENT DOCUMENTS

| | | |
|---|---|---|
| 1,861,532 A | 6/1932 | Hough |
| 1,948,788 A | 2/1934 | Goldberg |
| 1,950,093 A | 3/1934 | Robinson |
| 2,149,660 A | 3/1939 | Blood, Jr. |
| 2,169,948 A | 8/1939 | Gallupe |
| 2,174,600 A | 10/1939 | Schutmaat |
| 2,176,295 A | 10/1939 | Creveling |
| 2,185,164 A | 12/1939 | Weinreb |
| 2,196,013 A | 4/1940 | Govan |
| 2,278,356 A | 3/1942 | Livingston |
| 2,288,108 A | 6/1942 | Roll |
| 2,301,213 A | 11/1942 | Kang |
| 2,503,281 A | 4/1950 | Lynch |
| 2,529,685 A | 11/1950 | Ginter |
| 2,564,041 A | 8/1951 | Vogel, Jr. |
| 2,575,521 A | 11/1951 | Ireland |
| 2,587,938 A | 3/1952 | Warren |
| 2,594,242 A | 4/1952 | Wilson |
| 2,616,646 A | 11/1952 | Matthysse |
| 2,621,882 A | 12/1952 | Fletcher |
| 2,663,973 A | 12/1953 | White |
| 2,706,133 A | 4/1955 | North, Jr. et al. |
| 2,717,141 A | 9/1955 | Livingston |
| 2,739,779 A | 3/1956 | Krone |
| 2,770,493 A | 11/1956 | Fieber |
| 2,807,486 A | 9/1957 | Bixby |
| 2,829,908 A | 4/1958 | Brochetti |
| 2,910,316 A | 10/1959 | Dier |
| 2,929,397 A | 3/1960 | Sloan |
| 2,953,161 A | 9/1960 | Muller |
| 3,030,128 A | 4/1962 | Versen |
| 3,064,998 A | 11/1962 | Syverson |
| 3,097,865 A | 7/1963 | Zeeb |
| 3,142,501 A | 7/1964 | Clark |
| 3,143,146 A | 8/1964 | Kennedy |
| 3,147,568 A | 9/1964 | Inhofer |
| 3,198,480 A | 8/1965 | Morse |
| 3,235,187 A | 2/1966 | Merritt |
| 3,310,239 A | 3/1967 | Hesp |
| 3,357,642 A | 12/1967 | Horton |
| 3,230,969 A | 1/1968 | Purtell |
| 3,386,754 A | 6/1968 | Morrison |
| 3,395,725 A | 8/1968 | Roach |
| 3,409,315 A | 11/1968 | Wichers |
| 3,421,792 A | 1/1969 | Sundholm |
| 3,430,645 A | 3/1969 | Stalph |
| 3,478,967 A | 11/1969 | Horton |
| 3,514,038 A | 5/1970 | McQuinn |
| 3,515,349 A | 6/1970 | Mecklin |
| 3,625,428 A | 12/1971 | Mecklin |
| 3,679,236 A | 7/1972 | Warshawsky |
| 3,730,228 A | 5/1973 | Gibbs, Sr. |
| 3,810,490 A | 5/1974 | Ludwick |
| 3,866,834 A | 2/1975 | Shannon |
| 3,913,836 A | 10/1975 | Stevenson |
| 3,968,933 A | 7/1976 | Waldrum |
| 4,111,465 A | 9/1978 | Knight |
| 4,197,998 A | 4/1980 | Jolly, Jr. |
| 4,231,306 A | 11/1980 | Whitehead |
| 4,232,705 A | 11/1980 | Hait |
| 4,350,294 A | 9/1982 | Gaspard |
| 4,429,831 A | 2/1984 | Maddox |
| 4,479,610 A | 10/1984 | Etheridge |
| 4,521,988 A | 6/1985 | Thacker |
| 4,543,007 A | 9/1985 | Quiogue |
| 4,598,864 A | 7/1986 | Jarinko |
| 4,641,781 A | 2/1987 | McCrea |
| 4,700,017 A | 10/1987 | Morand |
| 4,736,888 A | 4/1988 | Fasnacht |
| 4,752,979 A | 6/1988 | Goacher, Sr. |
| 4,753,128 A | 6/1988 | Bartlett |
| 4,784,324 A | 11/1988 | DeWitt |
| 4,842,195 A | 6/1989 | Koll |
| 4,844,346 A | 7/1989 | Coffey |
| 4,970,973 A | 11/1990 | Lyle |
| 5,037,231 A | 8/1991 | Kitamura |
| 5,082,177 A | 1/1992 | Hill |
| 5,215,255 A | 6/1993 | Kubacak |
| 5,219,240 A | 6/1993 | Kitamura |
| 5,267,695 A | 12/1993 | Thayer |
| 5,326,030 A | 7/1994 | Benest |
| 5,435,051 A | 7/1995 | Cheremshynski |
| 5,437,480 A | 8/1995 | Weil |
| 5,481,815 A | 1/1996 | Murphy |
| 5,507,435 A | 4/1996 | Benest |
| 5,676,402 A | 10/1997 | Eley |
| 5,685,661 A | 11/1997 | Marka |
| 5,720,127 A | 2/1998 | Robertson |
| 5,779,163 A | 7/1998 | Gunter |
| 5,839,632 A | 11/1998 | Koday |
| 5,893,538 A | 4/1999 | Onishi |
| 5,904,379 A | 5/1999 | Chang |
| 5,957,383 A | 9/1999 | Benest |
| 6,138,770 A | 10/2000 | Kayser |
| 6,189,488 B1 | 2/2001 | Goldsher |
| 6,230,091 B1 | 5/2001 | McQuinn |
| 6,237,859 B1 | 5/2001 | Hill |
| 6,336,764 B1 | 1/2002 | Liu |
| 6,343,749 B1 | 2/2002 | Thom |
| 6,425,149 B1 | 7/2002 | Wang |
| 6,805,304 B1 | 10/2004 | Nokes |
| 7,150,419 B1 | 12/2006 | Tomlonovic |
| 7,152,811 B2 | 12/2006 | Gunlogson |
| 7,364,096 B1 | 4/2008 | Sosnowski |
| 7,413,132 B1 | 8/2008 | Bogart |
| 7,419,127 B2 | 9/2008 | Buehler |
| 7,478,972 B2 | 1/2009 | Takamori |
| 7,490,807 B2 | 2/2009 | Souza |
| 7,883,035 B2 | 2/2011 | Coleman |
| 7,931,650 B2 | 4/2011 | Winquist |
| 8,083,432 B2 | 12/2011 | Limpert |
| 8,132,741 B2 | 3/2012 | Tremblay, Jr. |
| 8,960,613 B2 | 2/2015 | White |
| 9,167,745 B2 | 10/2015 | Muff |
| 9,347,208 B2 | 5/2016 | Quinn |
| 9,453,376 B1 | 9/2016 | Raymond |
| 9,894,892 B2 | 2/2018 | Lawrence |
| 10,076,075 B1 | 9/2018 | Muff |
| 10,130,052 B2 | 11/2018 | Muff |
| 10,130,053 B2 | 11/2018 | Muff |
| 10,314,227 B2 | 6/2019 | Sudbrink |
| 10,455,824 B2 | 10/2019 | Lawrence |
| 2002/0113423 A1 | 8/2002 | Kim |
| 2003/0019949 A1 | 1/2003 | Solie |
| 2005/0047851 A1 | 3/2005 | Molenaar |
| 2006/0060735 A1 | 3/2006 | Oddsen, Jr. |
| 2009/0224122 A1 | 9/2009 | Liao |
| 2010/0224737 A1 | 9/2010 | LaFontaine |
| 2011/0017880 A1 | 1/2011 | Osborn |
| 2011/0114803 A1 | 5/2011 | Lee |
| 2012/0200078 A1 | 8/2012 | Puluc |
| 2012/0280490 A1 | 11/2012 | White |
| 2013/0043326 A1 | 4/2013 | Muff |
| 2013/0092766 A1 | 4/2013 | Schottler |
| 2013/0343806 A1 | 10/2013 | Ng |
| 2014/0124629 A1 | 5/2014 | Myerchin |
| 2014/0138496 A1 | 5/2014 | Jones |
| 2014/0283442 A1 | 9/2014 | Thomas, III |
| 2015/0159777 A1 | 6/2015 | White |
| 2016/0081321 A1 | 3/2016 | Schnaider |
| 2016/0120117 A1 | 5/2016 | Lawrence et al. |
| 2016/0177993 A1 | 6/2016 | Anderson |
| 2017/0049043 A1 | 2/2017 | Muff |
| 2017/0354137 A1 | 12/2017 | Dahlhauser |
| 2018/0177176 A1 | 6/2018 | Mayer |
| 2019/0000067 A1 | 1/2019 | Heinsohn et al. |
| 2019/0239500 A1 | 8/2019 | Barker |

DROP-DOWN APPLICATORS FOR AN AGRICULTURAL SPRAYER

RELATED DISCLOSURES

This application is a continuation of U.S. patent application Ser. No. 16/295,853, filed Mar. 7, 2019, the disclosure of which is hereby incorporated by reference in its entirety.

FIELD OF THE DISCLOSURE

The present disclosure relates to agricultural sprayers. Specifically, the present disclosure relates to drop-down applicators for agricultural sprayers.

SUMMARY

In one aspect, an agricultural vehicle is moveable across a surface. The agricultural vehicle includes a chassis, a traction member coupled to the chassis with the traction member configured to engage the surface and move the chassis relative to the surface, a holding tank coupled to the chassis with the holding tank configured to support agricultural matter, a support boom coupled to the chassis, and a plurality of applicator assemblies. Each applicator assembly of the plurality of applicator assemblies includes a resilient body coupled to the support boom, a foot coupled to the body with the foot configured to be biased into engagement with the surface via the resiliency of the body, and a nozzle. The nozzle is in communication with the holding tank and configured to dispense the agricultural matter.

In another aspect, the body includes a central axis, and the central axis is linear while the foot is configured to be spaced from the surface.

In another aspect, the central axis includes a curvature while the foot is configured to engage the surface.

In another aspect, each applicator assembly of the plurality of applicator assemblies includes a mount that rigidly couples the body to the support boom.

In another aspect, the body is coupled to the mount at a coupling location, a first distance is measured from an apex of the foot to the coupling location while the foot is configured to be spaced from the surface, a second distance is measured from a contact point on the foot to the coupling location while the foot is configured to engage the surface, and the first distance is greater than the second distance.

In another aspect, each applicator assembly of the plurality of applicator assemblies includes a bracket supporting the nozzle, and the nozzle is adjustable to change a dispensing direction of the nozzle relative to the bracket.

In another aspect, the foot is selectively coupled to the body.

In another aspect, the foot includes a material that has a greater stiffness than a material of the body.

In another aspect, the nozzle is a first nozzle, the holding tank is a first holding tank, and the agricultural matter is a first agricultural matter, the agricultural vehicle further comprises a second holding tank coupled to the chassis and configured to support a second agricultural matter, each applicator assembly of the plurality of applicator assemblies includes a second nozzle coupled to the body and positioned between the first nozzle and the support boom, and the second nozzle is configured to dispense the second agricultural matter.

In another aspect, an agricultural vehicle is moveable across a surface. The agricultural vehicle includes a chassis, a traction member coupled to the chassis with the traction member configured to engage the surface and move the chassis relative to the surface, a holding tank coupled to the chassis with the holding tank configured to support agricultural matter, a support boom coupled to the chassis, and an applicator assembly. The applicator assembly includes a frame non-pivotably coupled to the support boom with the frame including a portion configured to contact the surface and a nozzle coupled to the frame with the nozzle in communication with the holding tank and configured to dispense the agricultural matter. The nozzle is configured to move relative to the support boom in response to the frame flexing relative to the support boom.

In another aspect, the frame includes a body having a central axis, the portion of the frame includes a foot coupled to the body, and the central axis is linear while the foot is configured to be spaced from the surface.

In another aspect, the central axis includes a curvature while the foot is configured to engage the surface.

In another aspect, the applicator assembly includes a mount that rigidly couples the body to the support boom.

In another aspect, the body is coupled to the mount at a coupling location, a first distance is measured from an apex of the foot to the coupling location while the foot is configured to be spaced from the surface, a second distance is measured from a contact point on the foot to the coupling location while the foot is configured to engage the surface, and the first distance is greater than the second distance.

In another aspect, the applicator assembly includes a bracket supporting the nozzle, and the nozzle is adjustable to change a dispensing direction of the nozzle relative to the bracket.

In another aspect, an applicator assembly is configured to be coupled to a support boom of an agricultural vehicle that is moveable across a surface. The applicator assembly includes a resilient body configured to be coupled to the support boom, a foot coupled to the body with the foot configured to engage the surface, and a nozzle. The nozzle is configured to dispense agricultural matter to the surface. The nozzle is configured to move relative to the support boom in response to the body flexing relative to the support boom.

In another aspect, the body includes a central axis, and the central axis is linear while the foot is configured to be spaced from the surface.

In another aspect, the central axis includes a curvature while the foot is configured to engage the surface.

In another aspect, the foot is selectively coupled to the body.

In another aspect, the foot includes a material that has a greater stiffness than a material of the body.

Any of the above referenced aspects of the disclosure can be combined with any one or more of the above referenced aspects of the disclosure.

Other aspects of the disclosure will become apparent by consideration of the detailed description and accompanying drawings.

BRIEF DESCRIPTION OF THE DRAWINGS

FIG. 1 is a perspective view of an agricultural sprayer including a plurality of drop-down applicator assemblies coupled along a support boom of the agricultural sprayer.

FIG. 2 is a perspective view of one assembly of the plurality of drop-down applicator assemblies.

FIG. 3 is a rear view of one assembly of the plurality of drop-down applicator assemblies positioned between adjacent crop rows of an agricultural field.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
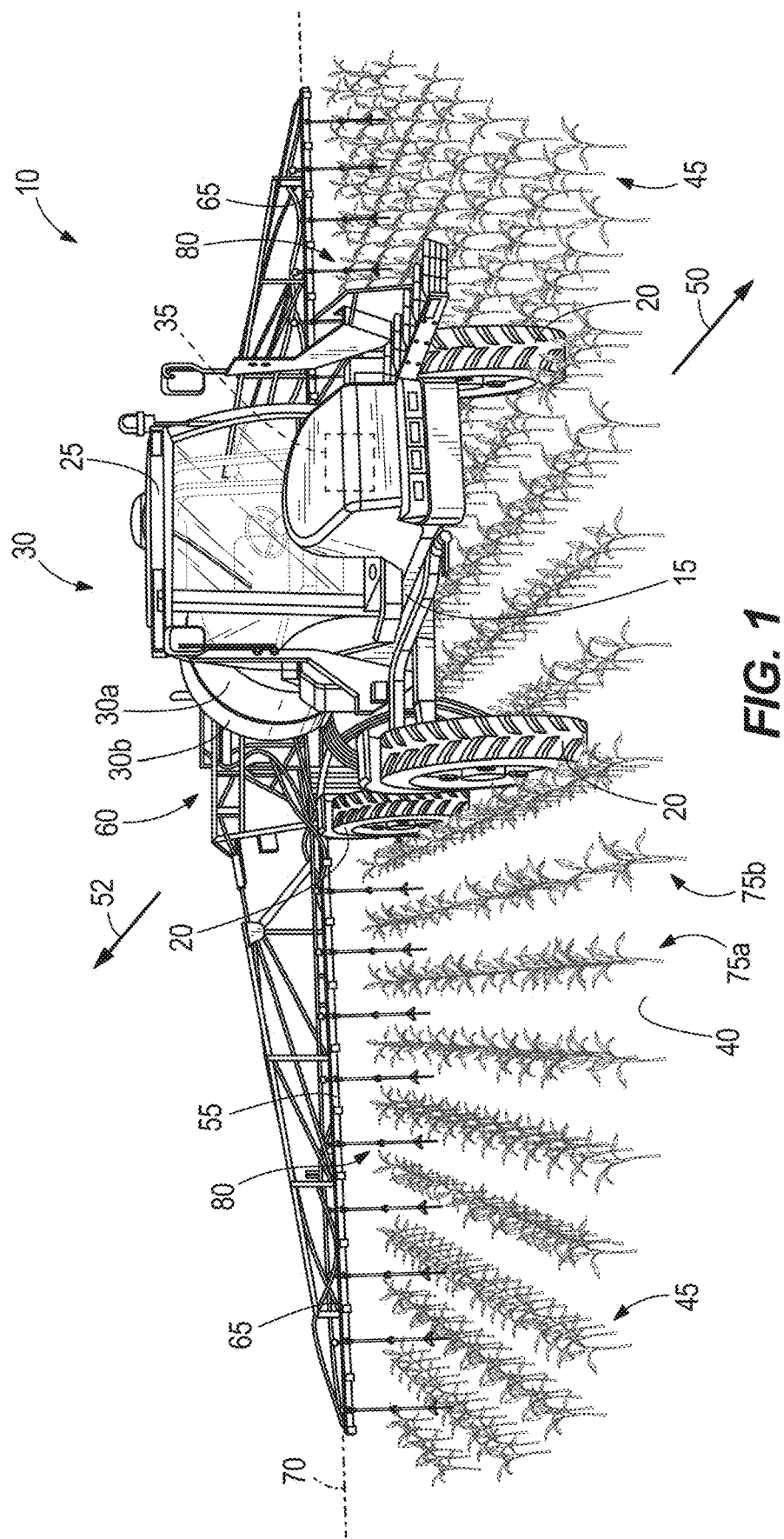

FIG. 1 illustrates an agricultural vehicle (e.g., an agricultural sprayer 10) that includes a chassis 15 having wheels 20 (e.g., traction members) to support a cab 25, two holding tanks 30, and a power unit 35 above an agricultural surface or ground 40. The holding tanks 30 are operable to carry agricultural matter (e.g., liquid fertilizer, liquid pesticide, liquid fungicide, dry/solid forms of nutrients, dry/solid forms of protection products, agricultural seeds, etc.) to be distributed onto crops 45 growing from the ground 40 or directly onto the ground 40. The power unit 35 provides mechanical, electrical, and hydraulic power to components of the sprayer 10. For example, the power unit 35 at least drives one of the wheels 20 to move the sprayer 10 across the ground 40 in a forward direction 50 or a rearward direction 52 and drives a delivery device (e.g. a pump) to dispense the agricultural matter within the holding tanks 30 onto the ground 40. In other embodiments, the wheels 20 can be continuous tracks operable to move the sprayer 10 relative to the ground 40.

The sprayer 10 includes a support boom 55 coupled to the chassis 15 behind the holding tanks 30 and the cab 25. A hydraulic assembly 60 (e.g., hydraulic cylinders) is coupled to the chassis 15 and the support boom 55 and is operable to raise and lower the support boom 55 relative to the chassis 15 and the ground 40. Spray nozzles 65 are positioned along a longitudinal axis 70 of the support boom 55 with each spray nozzle 65 fluidly coupled to at least one holding tank 30. The spray nozzles 65 are operable to dispense/spray the agricultural material within at least one holding tank 30 onto the ground 40 and the crops 45. In other embodiments, the support boom 55 can be positioned in front of the cab 25. In further embodiments, a pull-behind sprayer can include a frame and wheels/continuous tracks that support the support boom 55 above the agricultural field 40 and is selectively coupled to a vehicle (e.g., a tractor) to be pulled across the agricultural field 40. In some embodiments, the pull-behind sprayer can also include one or more holding tanks 30.

Figure 2:
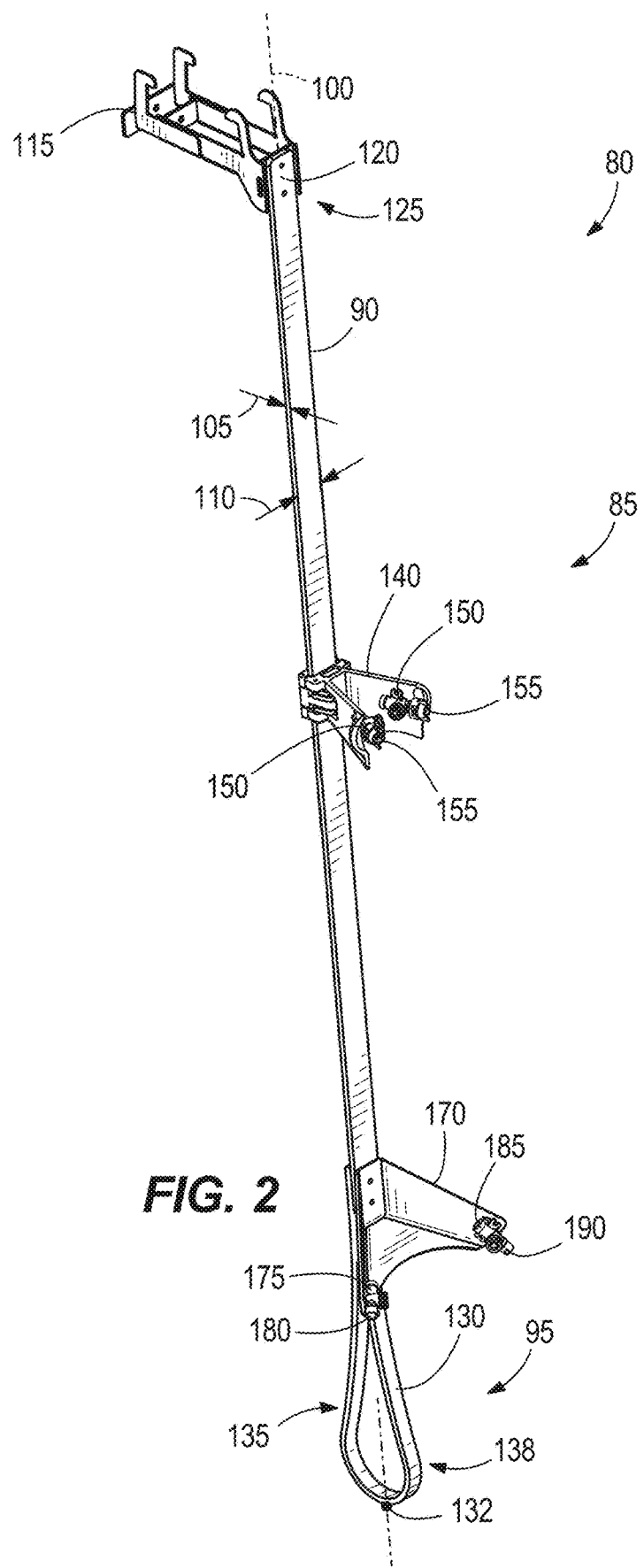

With continued reference to FIG. 1, a plurality of drop-down applicator assemblies 80 are positioned along the longitudinal axis 70 of the support boom 55. In particular, each applicator assembly 80 is positioned between adjacent spray nozzles 65 and configured as a light-weight design to not overload the support boom 55. FIG. 2 illustrates one applicator assembly 80, which is substantially similar to the other applicator assemblies 80. As such, only one applicator assembly 80 will be discussed in detail below but is also equally applicable to the other applicator assemblies 80.

Figure 3:
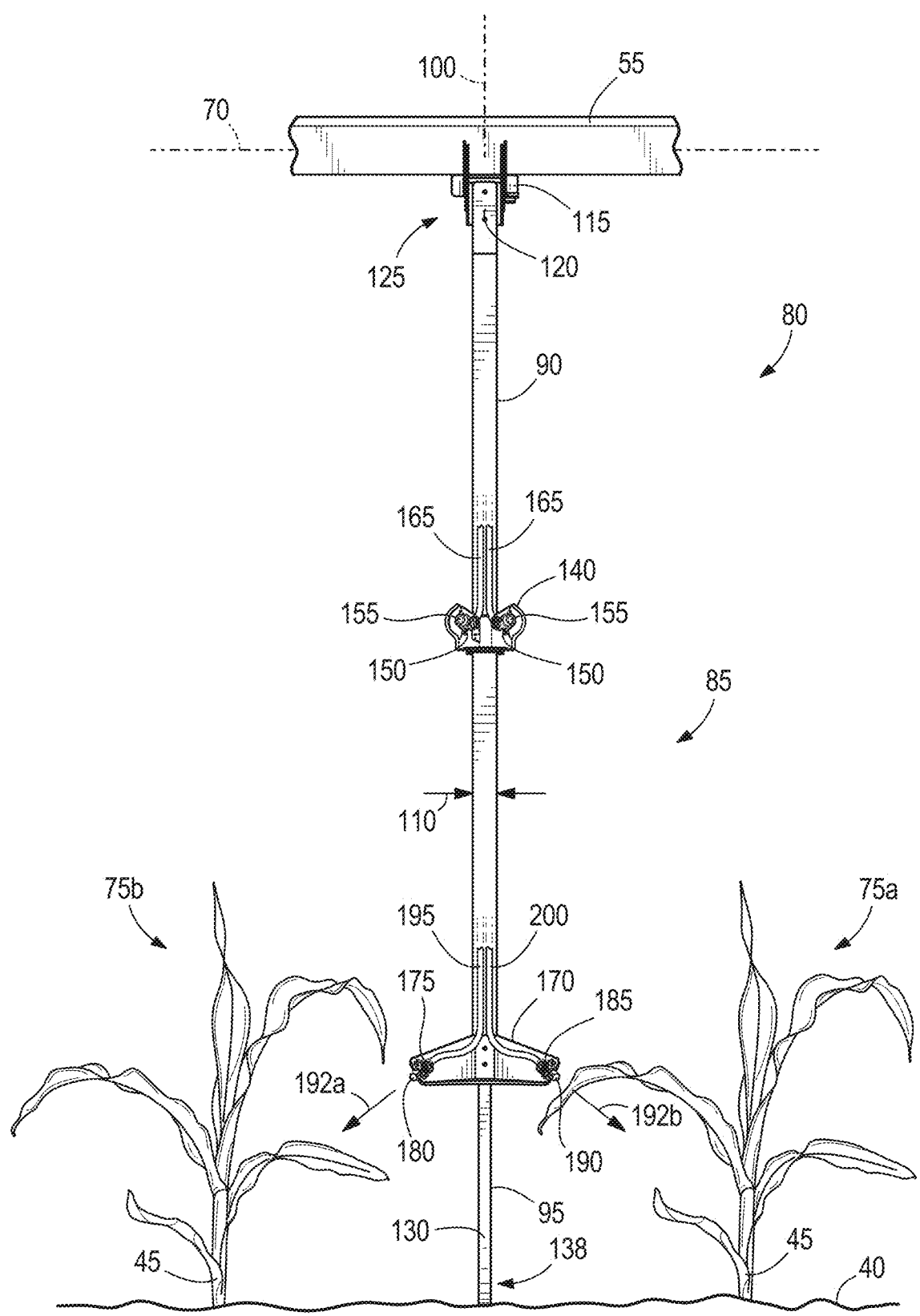

With reference to FIGS. 2 and 3, the applicator assembly 80 includes a resilient or flexible frame 85 having a body 90 (e.g., a first portion) coupled to the support boom 55 and a foot 95 (e.g., a second portion) coupled to the body 90. The body 90 includes a central axis 100 that is substantially linear while the frame 85 is in a default or relaxed position (FIG. 2). In other embodiments, the central axis 100 can include at least one curvature while the frame 85 is in the default position. In addition, the body 90 is substantially a strip of material having a rectangular cross section in a plane transverse to the central axis 100. For example, a thickness 105 of the body 90 is less than a width 110 of the body 90. The thickness 105 is measured in a direction parallel to the forward and rearward directions 50, 52, and the width 110 is measured in a direction parallel to the longitudinal axis 70 of the support boom 55. As a result, the body 90 is bendable/resilient in the forward and rearward directions 50, 52 but is substantially rigid in the direction transverse to the forward and rearward directions 50, 52.

A mount or clamp 115 is directly coupled to the support boom 55 and the body 90 and is adjustable to clamp onto different sized support booms 55. The mount 115 is also selectively coupled to the support boom 55 enabling the applicator assembly 80 to be selectively coupled to the support boom 55. A top portion 120 of the body 90 that interfaces with the mount 115 is rigidly coupled to the mount 115 such that the top portion 120 cannot pivot relative to the support boom 55. As such, the frame 85 is non-pivotably coupled to the support boom 55. The interface between the body 90 and the mount 115 defines a coupling location 125. In further embodiments, the mount 115 can be fixed to the support boom 55 by, for example, a welding process in which the applicator assembly 80 is non-removably coupled to the support boom 55.

The foot 95 is designed as a teardrop shape member and includes an outer surface 130 having an end or apex 132, a front curved side 135, and a rear curved side 138 with the front side 135 being symmetrical with the rear side 138 about the apex 132. The outer surface 130 of the foot 95 is configured to contact the ground 40. In other embodiments, the foot 95 can include a different shape (e.g., a C-shape member, a zig-zag shaped member, a pig-tail shaped member, a diamond shaped member, etc.). In one embodiment, the foot 95 is selectively coupled to and replaceable from the body 90 as the foot 95 is a wear component that engages the ground 40. In addition, the symmetry of the foot 95 allows for easy installation to the body 90 as the foot 95 can be rotated 180 degrees about the central axis 100 (as shown in FIG. 2) and still be properly coupled to the body 90. In the illustrated embodiment, the foot 95 includes a greater stiffness/hardness than the body 90 to decrease wear on the foot 95. In one embodiment, at least a portion of the frame 85 is manufactured from fiberglass, carbon fiber, or the like. For example, the body 90 can be manufactured from fiberglass (e.g., a nonferrous-based material), but the foot 95 can be manufactured from a different material (e.g., ferrous-based material) to decrease wear on the foot 95. In further embodiments, the body 90 and the foot 95 can be manufactured from similar materials, for example, the body 90 and the foot 95 can be both manufactured from a nonferrous-based material, or the body 90 and the foot 95 can be both manufactured from a ferrous-based material. In some embodiments, the foot 95 can be non-removably fixed to the body 90. In further embodiments, the body 90 can be formed integral with the foot 95 as one-piece component.

An upper bracket 140 (FIGS. 2 and 3) is coupled to the body 90 and supports upper spray nozzles 150 each having an outlet 155. The upper bracket 140 is slidably adjustable to selectively position the spray nozzles 150 along the central axis 100 of the body 90. The spray nozzles 150 are also adjustable relative to the upper bracket 140 to change an angle at which the outlets 155 are oriented (e.g., to change a dispensing direction of the outlets 155 relative to the upper bracket 140). For example, the spray nozzles 150 are manually pivotable relative to the upper bracket 140 and selectively secured to the upper bracket 140 to change the angle of the outlets 155. In other embodiments, the spray nozzles 150 can be electronically adjusted by an operator within the cab 25 of the sprayer 10 or automatically adjusted by a control processor to change the angle of the outlets 155. With reference to FIG. 3, upper nozzle lines 165 are coupled to the upper spray nozzles 150 and the first holding tank 30a to provide fluid communication between the first holding tank 30a and the upper spray nozzles 150. In other embodiments, the upper spray nozzles 150 can be in fluid communication with the second holding tank 30b, or each upper spray nozzle 150 can be in fluid communication with a different holding tank 30a, 30b.

A lower bracket 170 is coupled to the body 90 adjacent the foot 95 and supports a first lower spray nozzle 175 having a first lower outlet 180 and a second lower spray nozzle 185 having a second lower outlet 190. In other embodiments, the lower bracket 170 can be coupled to the foot 95. The spray nozzles 175, 185 are adjustable relative to the lower bracket 170 to change dispensing directions 192a, 192b of the outlets 180, 190 (FIG. 3). For example, the spray nozzles 175, 185 are manually pivotable relative to the lower bracket 170 to change the dispensing directions 192a, 192b of the outlets 180, 190. In other embodiments, the spray nozzles 175, 185 can be electronically adjusted by an operator within the cab 25 of the sprayer 10 or automatically adjusted by a control processor to change the dispensing directions 192a, 192b of the outlets 180, 190. A first lower nozzle line 195 is coupled to the first lower spray nozzle 175 and the second holding tank 30b to provide fluid communication between the second holding tank 30b and the first lower spray nozzle 175. Likewise, a second lower nozzle line 200 is coupled to the second lower spray nozzle 185 and the second holding tank 30b to provide fluid communication between the second holding tank 30b and the second lower spray nozzle 185. In other embodiments, the first and second lower spray nozzles 175, 185 can be in fluid communication with the first holding tank 30a, or each spray nozzle 175, 185 can be in fluid communication with a different holding tank 30a, 30b.

In operation, the sprayer 10 moves into an agricultural field such that each applicator assembly 80 is positioned between adjacent crop rows 75 (FIG. 1) with the support boom 55 in a raised position. As such, the applicator assemblies 80 are spaced from the ground 40 (FIG. 4) in the default position with the central axis 100 of each applicator assembly 80 extending substantially perpendicular to the ground 40. In this condition, a first distance 205 is measured from the apex 132 to the coupling location 125 in a direction vertical to the ground 40.

Figure 4:
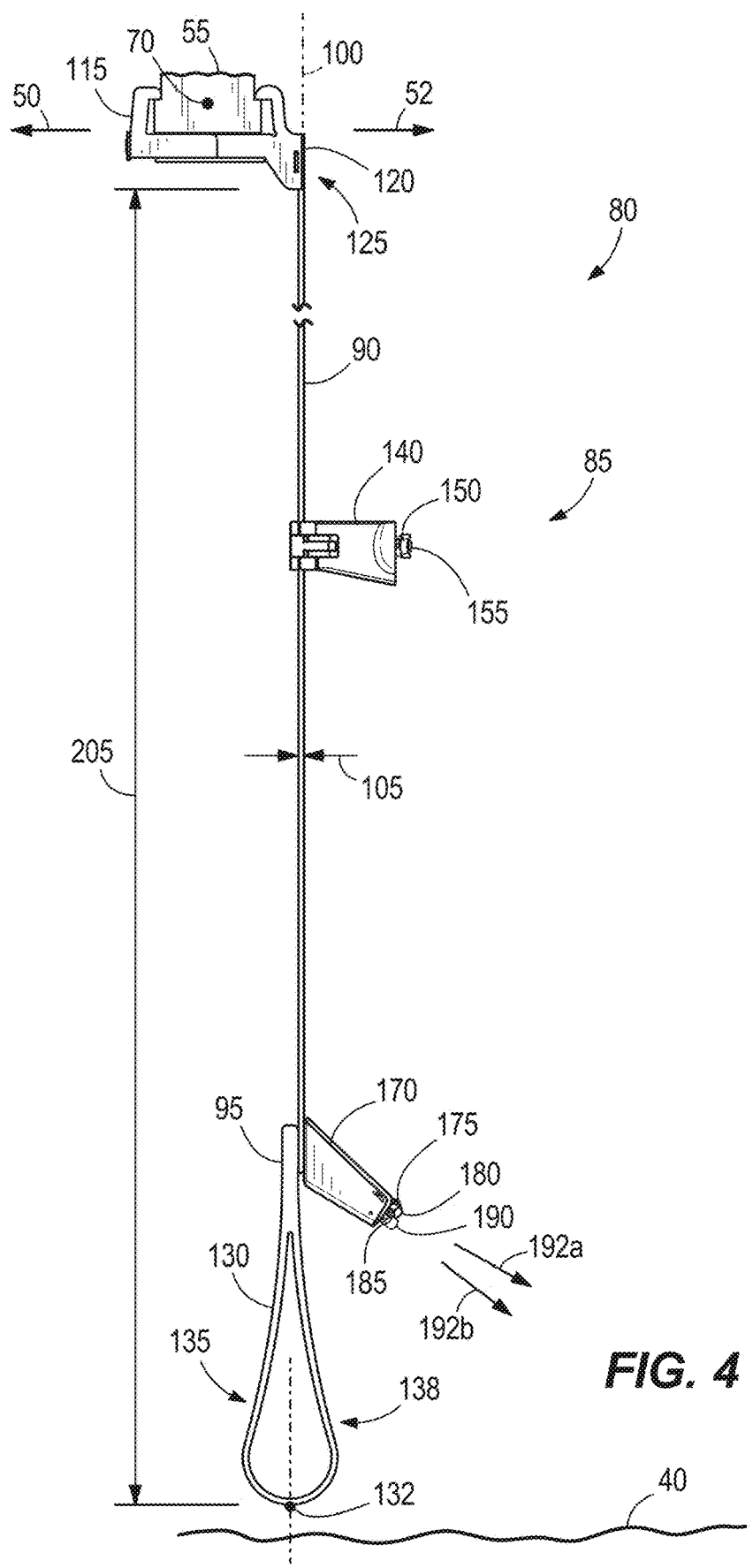
FIG. 4 is a side view of one assembly of the plurality of drop-down applicator assemblies spaced from the agricultural field.
Figure 5:
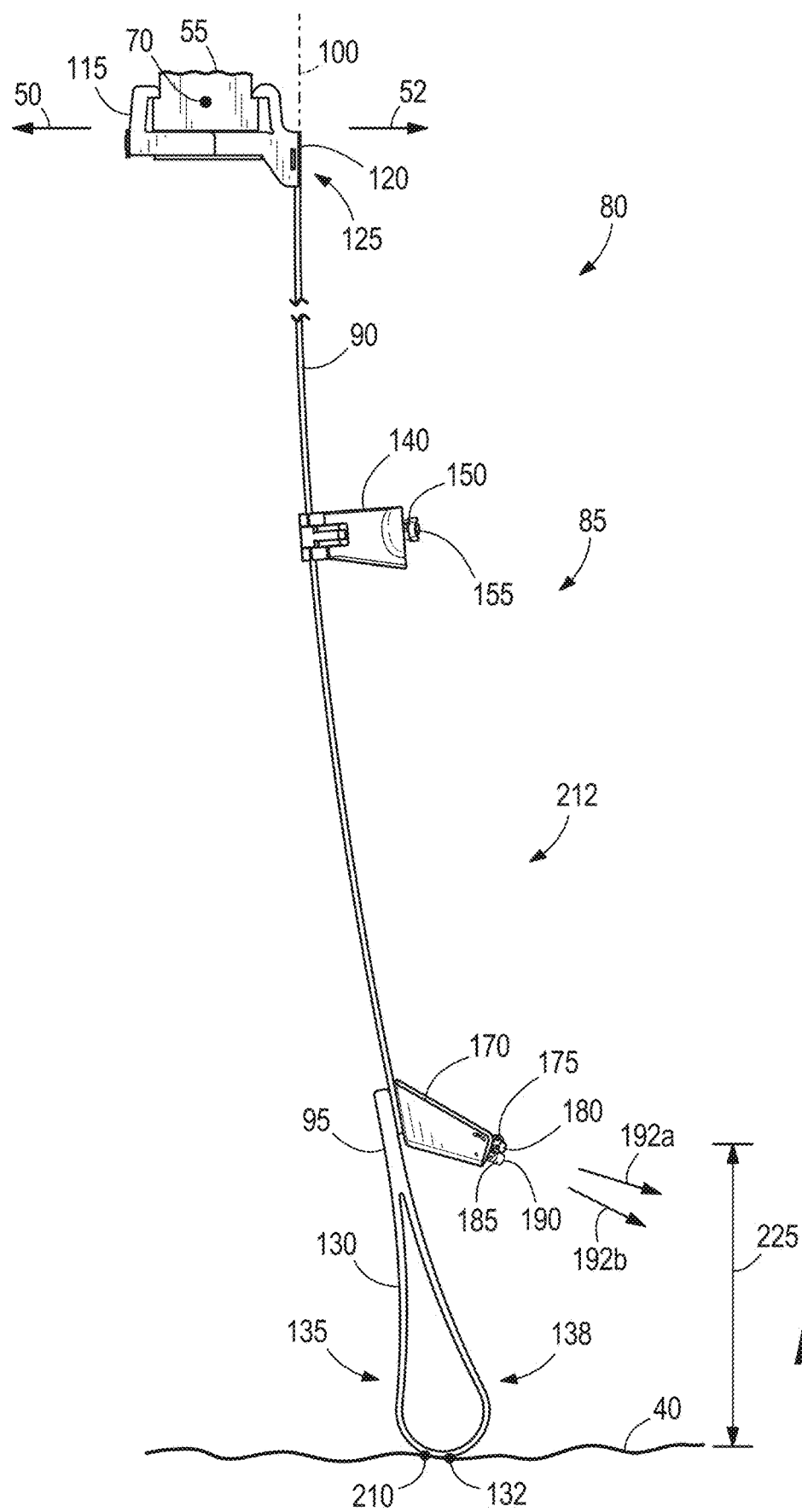
FIG. 5 is a side view of the drop-down applicator assembly of FIG. 4 contacting the agricultural field in a first configuration.

With reference to FIGS. 4 and 5, an operator of the sprayer 10 continues to move the sprayer 10 along the ground 40 as the operator lowers the support boom 55 by the hydraulic assembly 60 for the outer surface 130 of each foot 95 to engage the ground 40. A contact point 210 between each foot 95 and the ground 40 when each foot 95 initially contacts the ground 40 is located at the apex 132 of each foot 95. Continuing to lower the support boom 55 (as the sprayer 10 is moving in the forward direction 50) forces each body 90 to flex in the rearward direction 52 (FIG. 5) causing the contact point 210 to move from the apex 132 to the front side 135 of each foot 95. In other words, each body 90 includes a curvature 212 while the contact point 210 is located on the front side 135 of the foot 95. The support boom 55 is positioned at a desired height above the ground 40 such that all of the applicator assemblies 80 drag along the ground 40 and the resiliency of each body 90 biases the corresponding foot 95 into the ground 40. Once the support boom 55 is positioned at the desired height, the support boom 55 remains stationary relative to the chassis 15 during operation. In some embodiments, the desired height of the support boom 55 is dependent upon the dispensing directions 192a, 192b of the adjustable lower spray nozzles 175, 185. For example, it is advantageous to direct the dispensing directions 192a, 192b of the nozzles 175, 185 to a base of the crops 45 (FIG. 3), as discussed in more detail below. The orientation of the nozzles 175, 185 relative to the ground 40 will change depending on the height of the support boom 55 above the ground 40. With a greater flex in the body 90 (FIG. 6), the dispensing directions 192a, 192b will be oriented more upwardly away from the ground 40 than if the body 90 includes a lesser flex in which the dispensing directions 192a, 192b will be directed into the ground 40 (FIG. 5). In one embodiment, the operator can set the height of the support boom 55 such that there is some flex in each body 90 and then exit the cab 25 to adjust each lower nozzle 175, 185 (and the upper spray nozzles 150) such that the dispensing directions 192a, 192b are directed in a desired orientation.

As the sprayer 10 is traveling through the agricultural field, the sprayer 10 is operable to pump agricultural material (e.g., a liquid fertilizer) from at least one of the holding tanks 30 through the first and second lower nozzle lines 195, 200 to be dispensed/sprayed from the first and second lower outlets 180, 190. In one embodiment, the outlets 180, 190 are oriented toward the base of the crops 45 to increase the efficiency of applying the agricultural material closer to the root system of the crops 45. In other embodiments, a first flexible hose can be coupled to the first lower spray nozzle 175 with an end of the first flexible hose contacting the ground 40 adjacent the first row 75a, and a second flexible hose can be coupled to the second lower spray nozzle 185 with an end of the second flexible hose contacting the ground 40 adjacent the second row 75b. In this embodiment, the outlets of the first and second flexible hoses drag along the ground 40 and directly apply the agricultural material to the ground 40 adjacent the bases of the crops 45, rather than the agricultural material being sprayed onto the ground 40 and the crops 45 via the spray nozzles 175, 185.

In addition, the sprayer 10 is operable to pump another agricultural material (e.g., a liquid fungicide) from at least one of the holding tanks 30 through the upper nozzle lines 165 to be dispensed/sprayed from the first and second upper outlets 155. The illustrated first and second upper outlets 155 are oriented to dispense the agricultural material to a mid-portion and/or an upper portion of the crops 45 by, for example, pivoting the spray nozzles 150 relative to the upper bracket 140 and/or by sliding the upper bracket 140 along the body 90. The agricultural material can be dispensed from the upper spray nozzles 150 at the same time as the other agricultural material is being dispensed from the first and second lower spray nozzles 175, 185.

Figure 6:
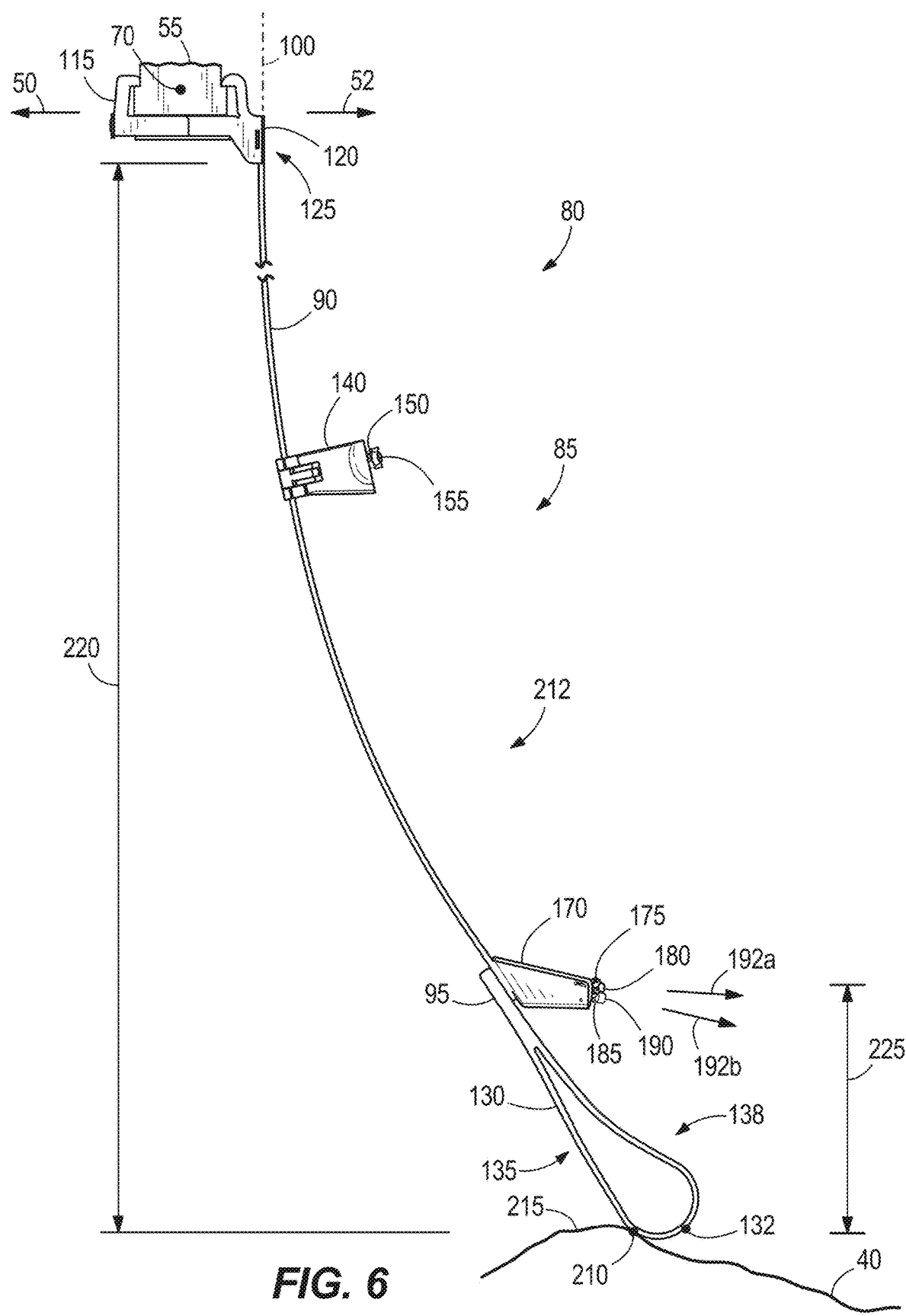
FIG. 6 is a side view of the drop-down applicator assembly of FIG. 4 contacting the agricultural field in a second configuration.

With reference to FIG. 6, the ground 40 can be uneven as the sprayer 10 travels over the ground 40 and dispenses agricultural material from the applicator assemblies 80. For example, the ground 40 can include a protrusion 215 in which one of the feet 95 can travel over as the sprayer 10 moves across the agricultural field. As the foot 95 engages the protrusion 215, the resiliency of the body 90 allows the body 90 to flex further in the rearward direction 52 causing the contact point 210 to move further upward on the front side 135 of the foot 95 toward the body 90. In this condition, a second distance 220 is measured from the contact point 210 to the coupling location 125 in a direction vertical to the ground 40, which is less than the first distance 205 (FIG. 4). In other words, the nozzles 175, 185 move relative to the support boom 55 as the sprayer 10 travels over the ground 40.

Moreover, the resiliency of each body 90 is such that a third distance 225 measured vertically from the contact point 210 to the outlets 180, 190 is generally constant as each body 90 flexes between the two different positions as shown in FIGS. 5 and 6. The foot 95 is rigid enough such that the difference in distances 225 as shown in FIGS. 5 and 6 is due to rotation of the foot 95 relative to the ground 40 as the body 90 deflects in the rearward direction 52. Accordingly, the dispensing directions 192*a*, 192*b* of the spray nozzles 175, 185 are generally constant (e.g., within a range of 30 degrees) as the sprayer 10 travels over the uneven ground 40 increasing the efficiency of applying the agricultural matter. In other embodiments, the dispensing directions 192*a*, 192*b* can move within a range of about 45 degrees to about 60 degrees as the sprayer 10 travels over the ground 40.

Figure 7:
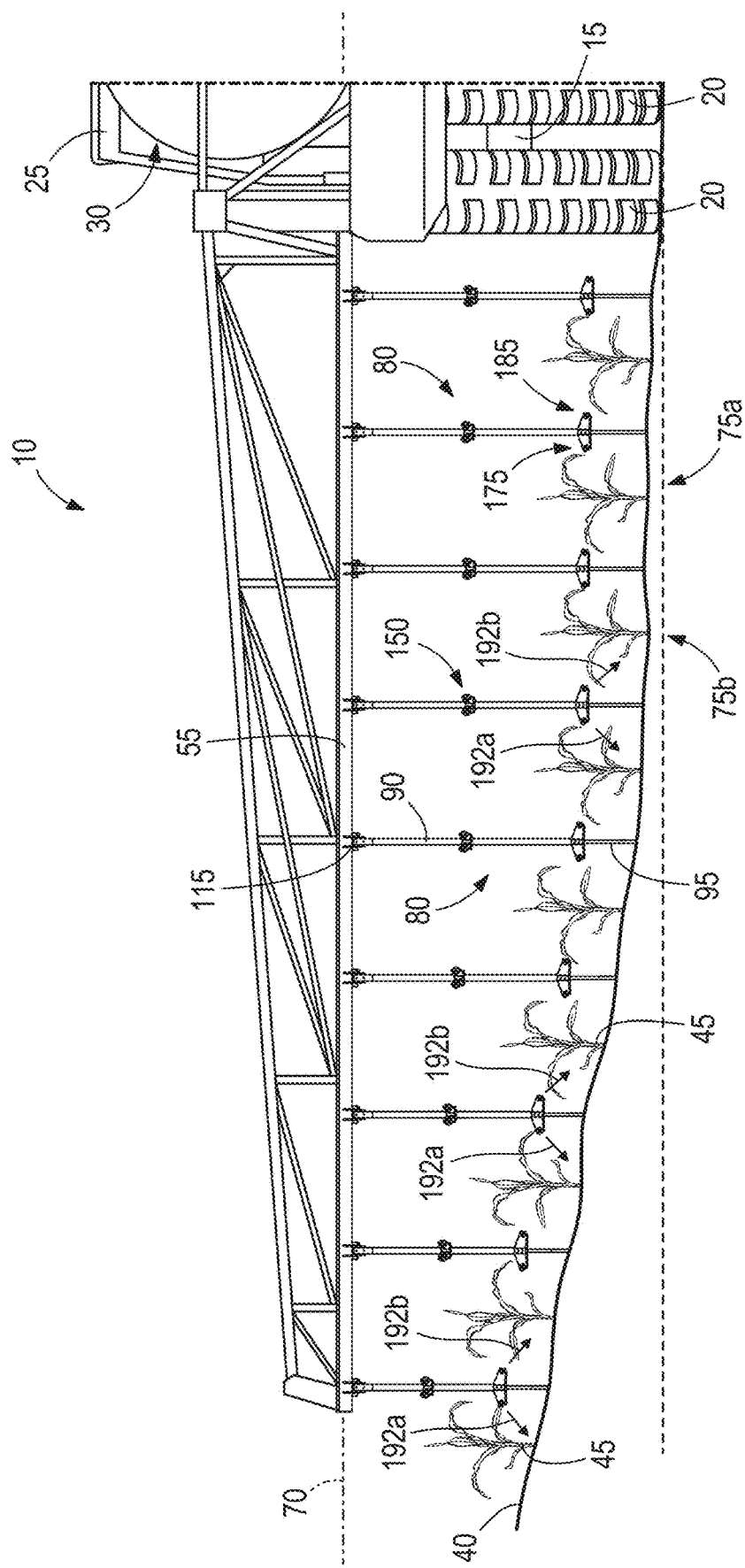
FIG. 7 is a rear view of the agricultural sprayer with the plurality of drop-down applicator assemblies contacting the agricultural field.

With reference to FIG. 7, each applicator assembly 80 is able to flex independently from the other applicator assemblies 80. As such, each applicator assembly 80 automatically adjusts/flexes as the sprayer 10 travels over the uneven ground 40 while the support boom 55 remains stationary relative to the chassis 15. This allows the operator to set the support boom 55 at one position and allow the applicator assemblies 80 to automatically adjust to the contours of the ground 40 to efficiently apply the agricultural matter to the crops 45.

The curved surface 130 of each foot 95 enables the sprayer 10 to move in the rearward direction 52 (if desired) without having the foot 95 catch on an object on the ground 40 causing the body 90 to flex in the forward direction 50. Rather, if the sprayer 10 moves in the rearward direction 52 while the foot 95 engages the ground 40, the foot 95 can again travel over objects/protrusions on the ground 40 and maintain the flex in the body 90 in the rearward direction 52.

Furthermore, due to the rigidity of the applicator assemblies 80 in the transverse direction to the longitudinal axis 70 of the support boom 55, each applicator assembly 80 is maintained between adjacent crop rows 75*a*, 75*b* (FIG. 7). However, in some embodiments, a first guide can be coupled to the lower bracket 170 adjacent the first lower spray nozzle 175 to project beyond one lateral side of the body 90, and a second guide can be coupled to the lower bracket 170 adjacent the second lower spray nozzle 185 to project beyond the other lateral side of the body 90. As such, the guides are operable to contact the crops 45 as the sprayer 10 moves along the ground 40 to help maintain the applicator assembly 80 between adjacent crop rows 75*a*, 75*b*.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An agricultural vehicle moveable across a surface in a forward direction, the agricultural vehicle comprising:
- a chassis;
- a holding tank coupled to the chassis, the holding tank configured to support agricultural matter;
- a support boom coupled to the chassis; and
- a plurality of applicator assemblies, each applicator assembly of the plurality of applicator assemblies comprising:
  - a resilient body having a first end and a second end, the first end being coupled to the support boom;
  - a foot coupled to the second end of the body, the foot defining a lowermost portion of the applicator assembly configured to be positioned above the surface;
  - a bracket coupled to the second end of the body adjacent the foot; and
  - a nozzle adjustably coupled to the bracket and disposed in communication with the holding tank for dispensing the agricultural matter;
- wherein the nozzle is adjustable to change a dispensing direction of the nozzle relative to the bracket;
- wherein the foot comprises a front side and a rear side, the front and rear sides being symmetrical with one another.

2. The agricultural vehicle of claim 1, wherein the body comprises a convex side having a curvature in the forward direction during operation when the lowermost portion engages the surface.

3. The agricultural vehicle of claim 1, wherein the body is positioned along a longitudinal axis while the foot is spaced from the surface during operation.

4. The agricultural vehicle of claim 1, wherein the foot is selectively coupled to the body.

5. The agricultural vehicle of claim 1, wherein the foot comprises a material that has a greater stiffness than a material of the body.

6. The agricultural vehicle of claim 1, further comprising a second nozzle coupled to the bracket at a location spaced from the first nozzle, the second nozzle disposed in communication with the holding tank for dispensing agricultural matter.

7. The agricultural vehicle of claim 6, further comprising:
- a first flexible hose coupled to the first nozzle, the first flexible hose having a first end coupled to the first nozzle and a second end;
- a second flexible hose coupled to the second nozzle, the second flexible hose having a first end coupled to the second nozzle and a second end;
- wherein, the second ends of the first and second flexible hoses are spaced from the respective first ends and configured to engage the surface during operation.

8. The agricultural vehicle of claim 1, further comprising:
- a second bracket coupled to the body at a location between the support boom and the first bracket; and
- a second nozzle coupled to the second bracket.

9. The agricultural vehicle of claim 8, further comprising a second holding tank coupled to the chassis, the second holding tank configured to support a second agricultural matter;

wherein, the second nozzle is disposed in communication with the second holding tank for dispensing the second agricultural matter.

10. An agricultural vehicle moveable across a surface in a travel direction, the agricultural vehicle comprising:
- a chassis;
- a holding tank coupled to the chassis, the holding tank configured to support agricultural matter;
- a support boom coupled to the chassis; and
- an applicator assembly comprising:
  - a flexible, elongate body coupled to the support boom, the body defined along a longitudinal axis and at least a portion of the body having a rectangular cross section in a plane perpendicular to the longitudinal axis;
  - a foot comprising a front side and a rear side, the front side of the foot directly coupled to the body in a first orientation and the rear side of the foot directly coupled to the body in a second orientation;
  - a bracket coupled to the body adjacent to the foot;
  - a nozzle coupled to the bracket and disposed in communication with the holding tank, the nozzle configured to dispense the agricultural matter;
  - wherein, a lowermost portion of the foot is located below the bracket and the nozzle.

11. The agricultural vehicle of claim 10, wherein the nozzle is configured to move relative to the support boom in response to the applicator assembly flexing relative to the support boom.

12. The agricultural vehicle of claim 10, further comprising a second nozzle adjustably coupled to the bracket, the second nozzle disposed in communication with the holding tank and configured to dispense the agricultural matter.

13. The agricultural vehicle of claim 12, wherein:
the second nozzle is spaced from the first nozzle;
the first nozzle is configured to dispense the agricultural matter in a first dispensing direction;
the second nozzle is configured to dispense the agricultural matter in a second dispensing direction.

14. The agricultural vehicle of claim 13, wherein the first and second dispensing directions are oriented at angles between 0° and 90° relative to the longitudinal axis.

15. The agricultural vehicle of claim 10, further comprising a flexible hose having a first end and a second end, the first end of the flexible hose being coupled to the nozzle and the second end thereof defining an outlet for dispensing agricultural material and configured to engage the surface.

16. The agricultural vehicle of claim 10, wherein the nozzle is adjustably coupled to the bracket such that a dispensing direction of the nozzle is adjustable relative to the bracket and the body.

17. An applicator assembly configured to be coupled to a support boom of an agricultural vehicle that is moveable across a surface in a forward travel direction, the applicator assembly comprising:
- a unitary, flexible body configured to be coupled to the support boom;
- a foot coupled to the body, the foot configured to engage the surface;
- a bracket coupled to the body adjacent the foot; and
- a nozzle adjustably coupled to the bracket, the nozzle including an outlet configured to dispense agricultural matter to the surface;
- wherein the nozzle is configured to move relative to the support boom in response to the body flexing relative to the support boom;
- wherein the foot comprises a first curved portion and a second curved portion, the first and second curved portions formed in a plane which is parallel to the forward travel direction.

18. The applicator assembly of claim 17, wherein the foot comprises a lowermost portion positioned above the ground, the bracket and nozzle being located above the lowermost portion during operation.

19. The applicator assembly of claim 17, wherein the foot comprises an oval-like shape.

* * * * *